United States Patent [19]

Hiratsuka et al.

[11] Patent Number: 4,841,377
[45] Date of Patent: Jun. 20, 1989

[54] CONTINUOUS IMAGE ESTIMATION METHOD

[75] Inventors: Seiichiro Hiratsuka; Masahiko Matsunawa, both of Hachioji, Japan

[73] Assignee: Konishiroku Photo Industry Co., Ltd., Tokyo, Japan

[21] Appl. No.: 62,556

[22] Filed: Jun. 11, 1987

[30] Foreign Application Priority Data

Jun. 14, 1986 [JP] Japan ................................ 61-138892
Jun. 14, 1986 [JP] Japan ................................ 61-138893

[51] Int. Cl.⁴ ............................................. H04N 1/40
[52] U.S. Cl. ................................... 358/283; 358/298
[58] Field of Search ..................... 358/283, 280, 298; 382/52, 53, 54

[56] References Cited

U.S. PATENT DOCUMENTS

| | | | |
|---|---|---|---|
| 4,630,125 | 12/1986 | Roetling | 358/283 |
| 4,633,327 | 12/1986 | Roetling | 358/283 |
| 4,710,823 | 12/1987 | Kitazawa | 358/283 |
| 4,730,221 | 3/1988 | Roetling | 358/283 |
| 4,758,897 | 7/1988 | Hiratsuka et al. | 358/283 |

Primary Examiner—Edward L. Coles, Sr.
Attorney, Agent, or Firm—Frishauf, Holtz, Goodman & Woodward

[57] ABSTRACT

A continuous image estimation method of a binary image wherein only one scanning aperture satisfying a predetermined condition for each picture element of a continuous image to be estimated from a plurality of scanning apertures for each kind in a dither image formed of a dither matrix, and the continuous image is estimated on the basis of the number of white or black picture elements in the scanning aperture selected. The predetermined condition is that a gradation expression is conducted in a lower spatial frequency range by using larger scanning apertures and in a higher spatial frequency range by using smaller scanning apertures, and that for the coincidence between patterns of a dither image in the scanning aperture and a binary image, which is made binary with the dither matrix from a continuous image formed on the bases of the number of the white or black picture elements in the scanning aperture, the patterns being obtained by comparing the dither image and the binary image for each aperture.

19 Claims, 19 Drawing Sheets

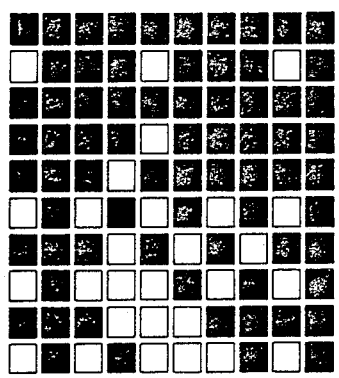

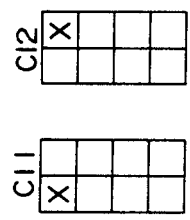
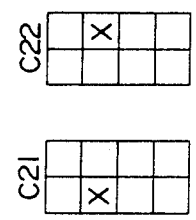
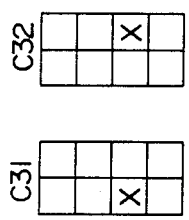
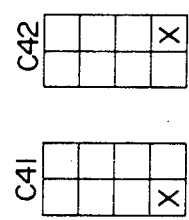
FIG. 5
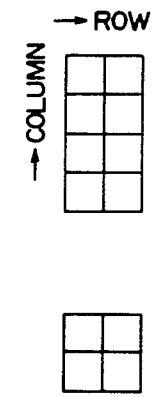
FIG. 2(A)  FIG. 2(B)  FIG. 2(C)  FIG. 2(D)
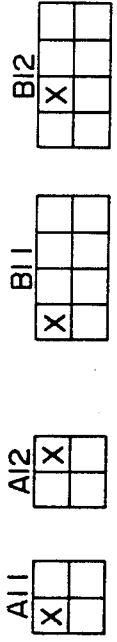
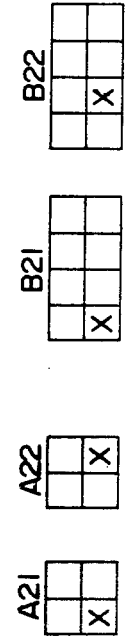
FIG. 4
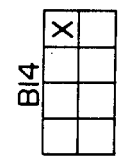
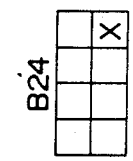
FIG. 3

FIG. 7

CONTINUOUS IMAGES BY APERTURE A

A12'
```
4 0 0 4 4 0 0 4 4 *
4 0 0 4 4 0 0 4 4 *
0 0 0 4 4 4 4 0 0 *
0 0 4 8 4 4 4 0 0 *
4 4 8 8 4 4 4 4 4 *
4 4 8 8 8 8 4 4 4 *
4 4 12 12 8 8 4 4 4 *
4 4 12 16 12 8 4 4 4 *
4 4 8 12 16 12 4 4 4 *
   12 16 12
* * * * * * * * * *
* * * * * * * * * *
```

A22'
```
* 4 0 0 4 4 0 0 4 4
* 4 0 0 4 4 0 0 4 4
* 0 0 0 4 4 4 4 0 0
* 0 0 4 8 4 4 4 0 0
* 4 4 8 8 4 4 4 4 4
* 4 4 8 8 8 8 4 4 4
* 4 4 4 12 12 8 8 4 4 4
* 4 4 4 12 16 12 8 4 4 4
* 4 4 8 12 16 12 4 4 4
       12 16 12
* * * * * * * * * *
* * * * * * * * * *
```

→ ROW
↓ COLUMN

CONTINUOUS IMAGES BY APERTURE B

FIG. 9

CONTINUOUS IMAGES BY APERTURE C

FIG. 10

CONTINUOUS IMAGES BY APERTURE D

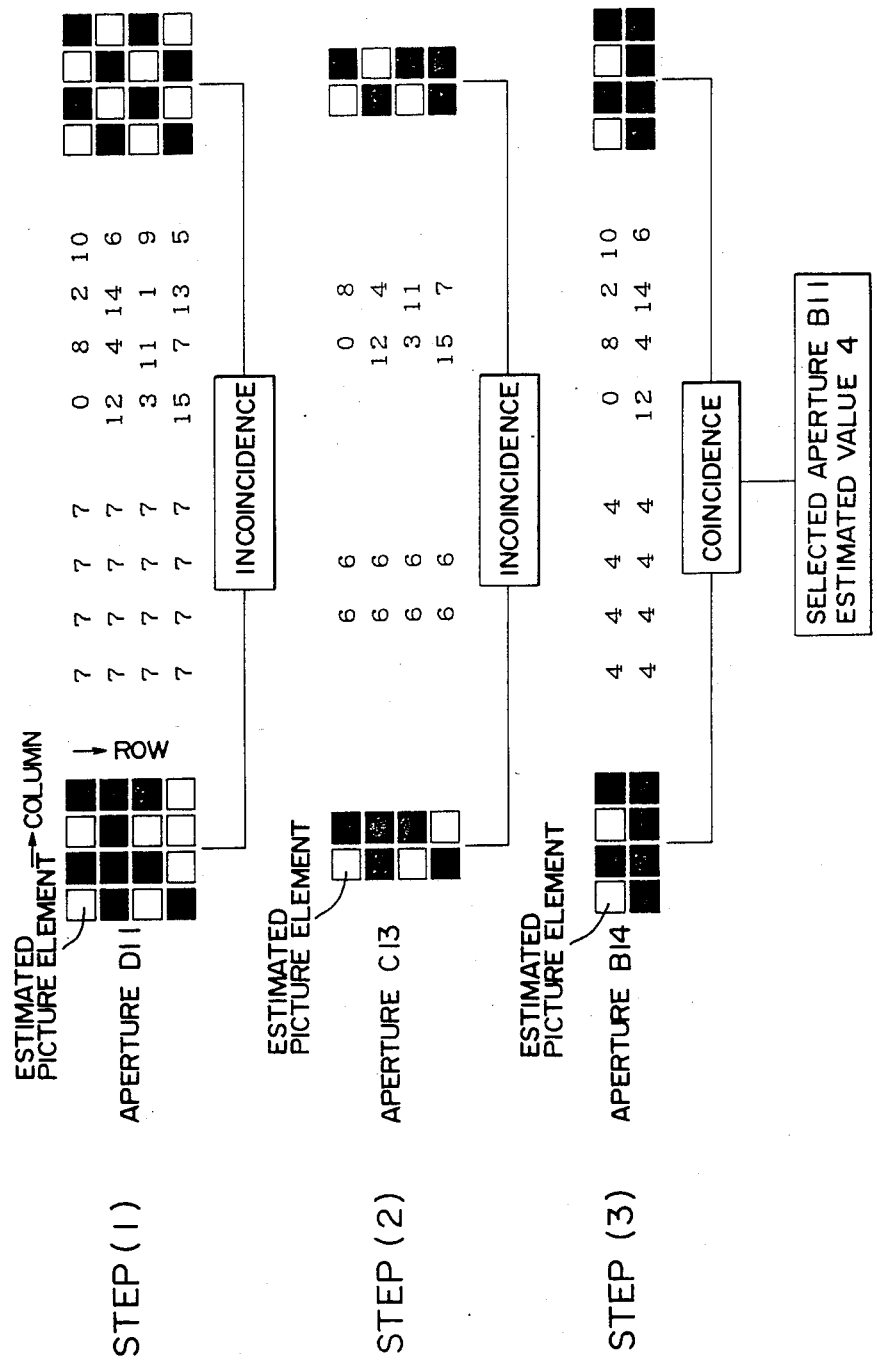

FIG. 17
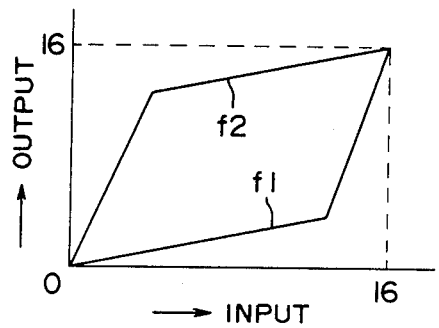
FIG. 16
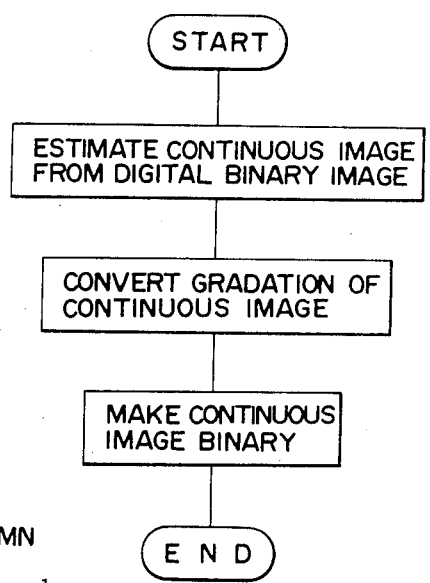
FIG. 15(A)
```
                    → COLUMN
  4  4  4  4  2  2  1  1  1  1
  4  4  4  6  4  4  1  1  1  1
  4  4  4  6  4  4  1  1  1  1
  8 12 16  8  8  8  1  3  1  3
 12 10 10  8  4  4  3  3  3  3       ↓
 16  8  8 10  4  4  4  3  3  3       ROW
  4  4  4  4  4  4  3  2  2  2
  4  4  4  4  4  2  2  2  2  2
  4  4  4  4  4  2  2  2  2  2
  4  4  4  4  4  2  2  2  2  2
```
ESTIMATED CONTINUOUS IMAGE
FIG. 15(B)
```
B11 B12 B12 B12 B12 B12 D11 D12 D13 D14
B11 B12 B23 C21 B23 B23 D21 D22 D23 D24
B21 B22 B23 C21 B23 B24 D31 D32 D33 D34
A21 A12 A12 C21 B12 B13 D41 D12 D43 D14
A21 B11 B12 C21 D11 D12 D12 D22 D23 D24
A21 B11 B12 B23 D21 D22 D23 D23 D23 D24
D11 D12 D12 D12 D31 D32 D32 D23 D23 D24
D21 D22 D23 D23 D23 D31 D32 D23 D23 D24
D31 D32 D32 D32 D33 D31 D32 D32 D33 D34
D41 D42 D43 D43 D43 D41 D42 D43 D43 D44
```
SCANNING APERTURE SELECTING SITUATION

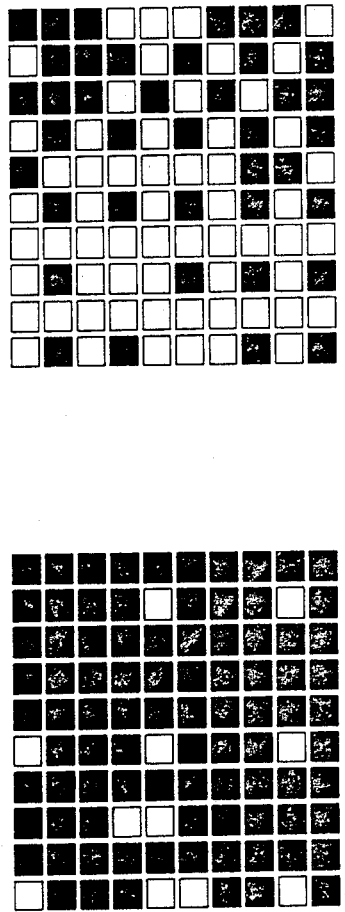
FIG. 18(A) CONTINUOUS IMAGE AFTER f1 CONVERSION
FIG. 18(B) CONTINUOUS IMAGE AFTER f2 CONVERSION
FIG. 18(C) DITHER IMAGE AFTER f1 CONVERSION
FIG. 18(D) DITHER IMAGE AFTER f2 CONVERSION

HIGH-PASS CONVOLUTION
FILTER

LOW-PASS CONVOLUTION
FILTER

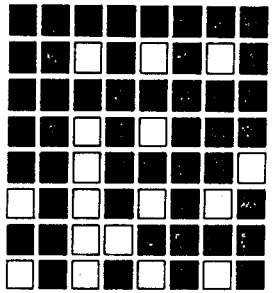
FIG. 21(D) HIGH-PASS DITHER IMAGE
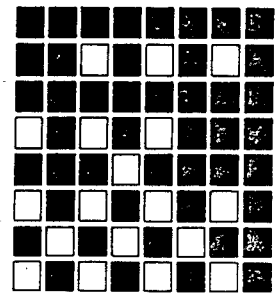
FIG. 21(E) LOW-PASS DITHER IMAGE
FIG. 21(C)
```
 0  8  2 10  6  9
12  4 14  1 13  5
 3 11  7
15
```
DITHER MATRIX
FIG. 21(A)
```
           → COLUMN
         →ROW
  4   2  12   6  -1   0   1   1
 -4 -10   8  -2   5  -2  -1   1
 22  46   2  16  23 -10   9  -5
  8   8  -4   1   3   3   5
  2   8  26  -2   4   7   3   4
  0   0  -2   4   7   3   0   1
  4   4   4   6  -2   1   2   2
  4   4   4   6   0   2   2   2
```
HIGH-PASS CONTINUOUS IMAGE
FIG. 21(B)
```
  4   2   2   2   1   1   1   1
  7   4   4   4   2   1   1   1
  9   6   4   4   3   2   2   2
 11   8   6   4   4   3   3   3
  8   7   6   5   4   3   3   3
  6   6   6   4   4   3   2   2
  4   4   4   4   3   3   2   2
  4   4   4   3   3   2   2   2
```
LOW-PASS CONTINUOUS IMAGE

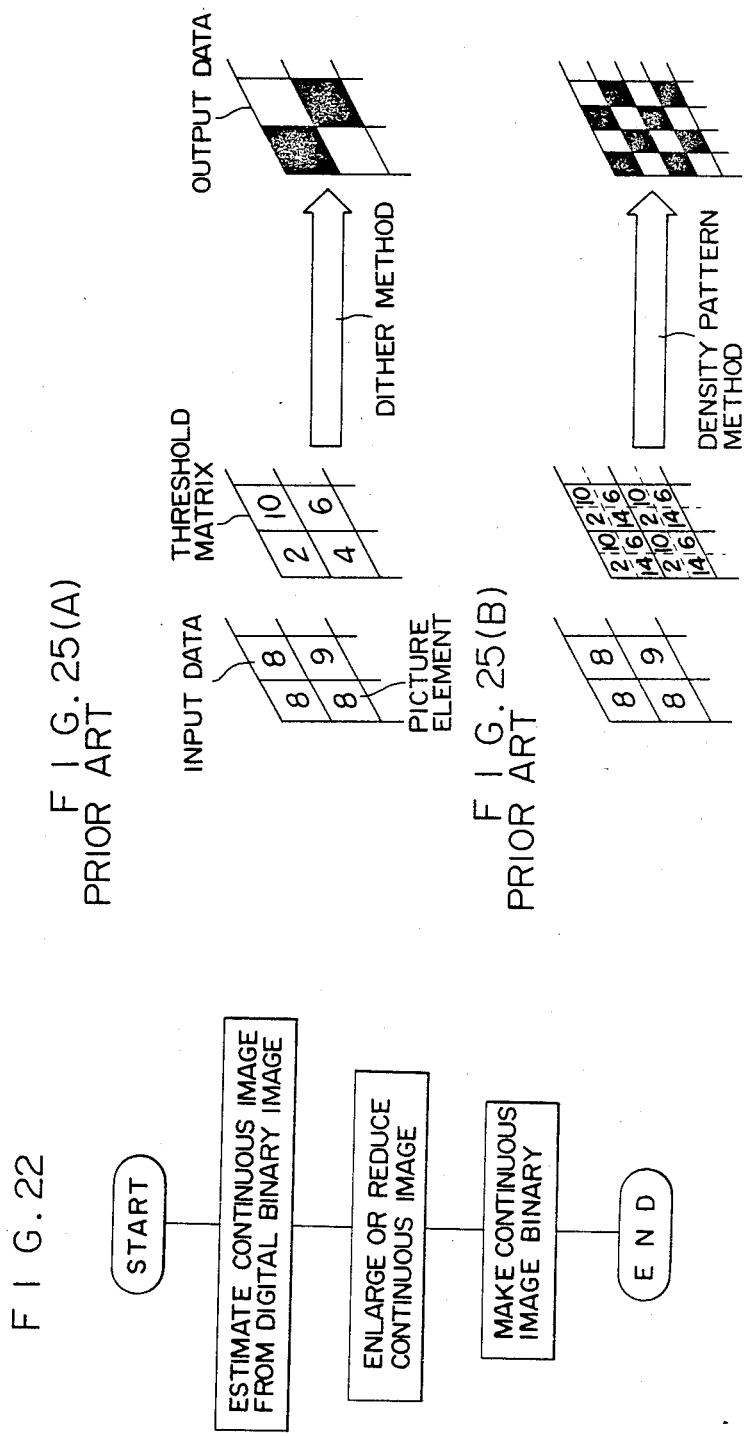

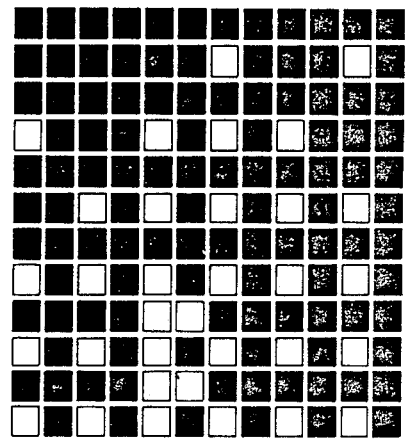
FIG. 23(D) ENLARGED DITHER IMAGE
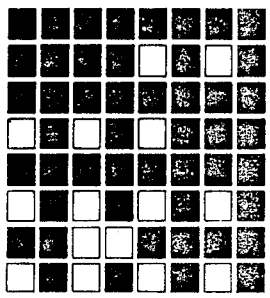
FIG. 23(E) REDUCED DITHER IMAGE
FIG. 23(A) ENLARGED CONTINUOUS IMAGE
FIG. 23(B) REDUCED CONTINUOUS IMAGE
FIG. 23(C) DITHER MATRIX

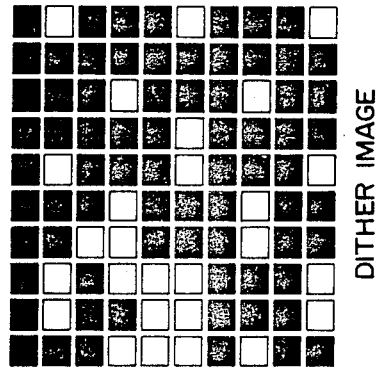
FIG. 24(A) ESTIMATED CONTINUOUS IMAGE
FIG. 24(B) DITHER MATRIX
FIG. 24(C) DITHER IMAGE

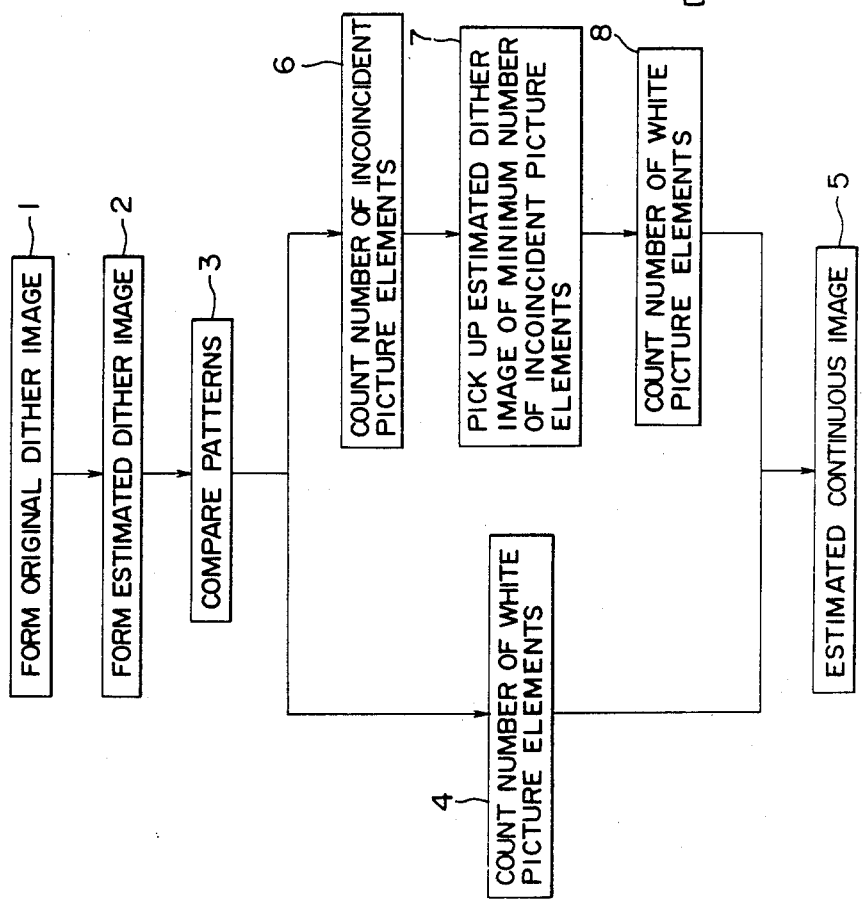
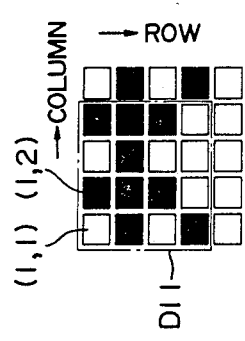
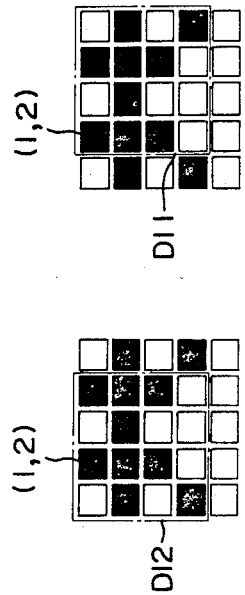

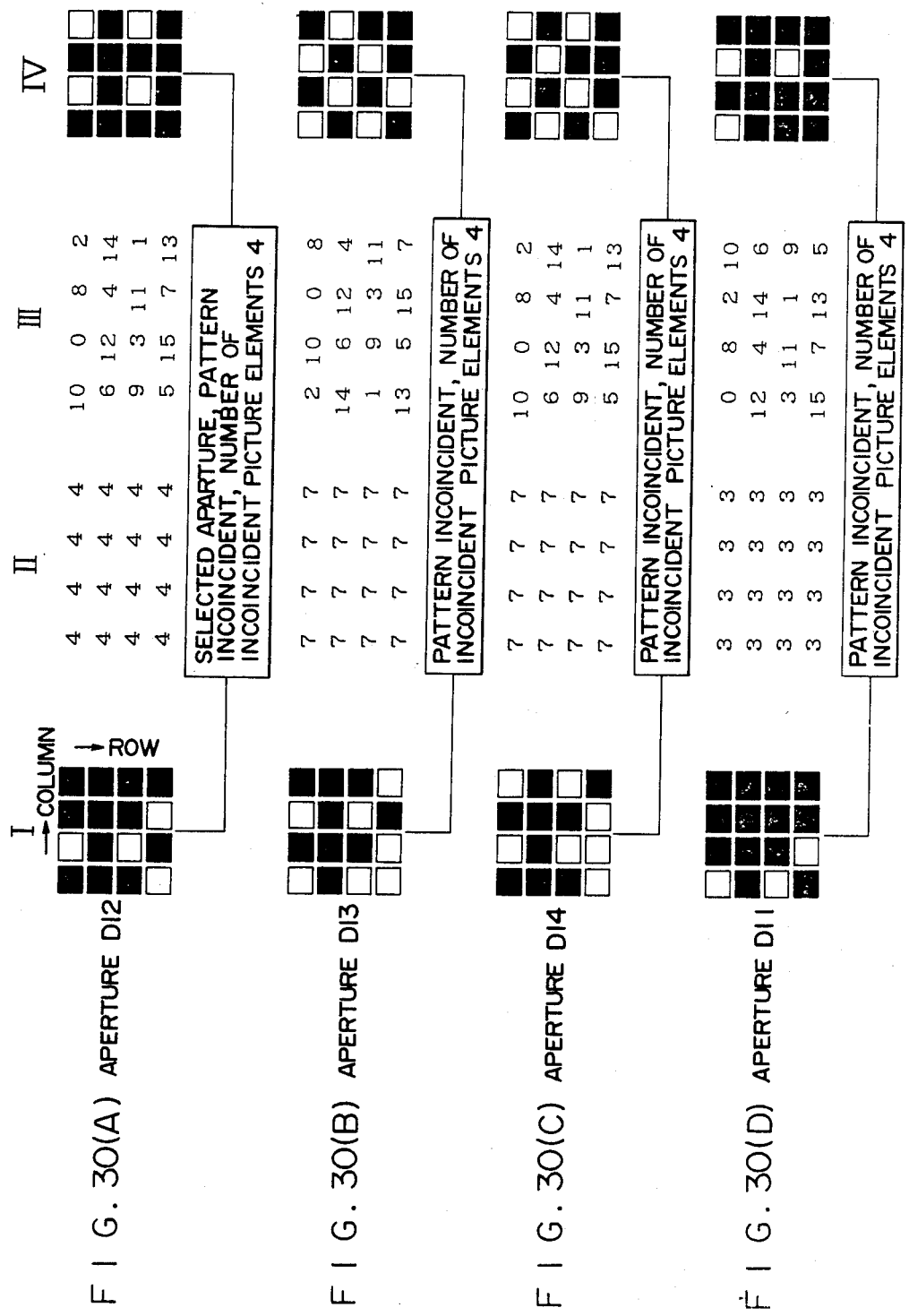

CONTINUOUS IMAGE ESTIMATION METHOD

BACKGROUND OF THE INVENTION

1. Field of the Invention

The present invention relates to a continuous image estimation method and, more particularly, to a continuous binary or dither image estimation method for estimating an original continuous image excellently a binary or dither image displayed in pseudo-halftone.

2. Description of the Prior Art

Most output units practised at present such as displays or printers cannot display images other than in binary values, i.e., in white and black colors.

As the method of falsely expressing a halftone by the use of such output unit, there is known a density pattern method (or a luminance pattern method) or a dither method.

Both the density pattern method and the dither method are a kind of areal gradation method and express a continuous image by changing the number of dots to be recorded in a constant area (i.e., matrix).

The density pattern method is one for recording a portion of an original corresponding to one picture element with a plurality of dots by using a threshold matrix, as shown in FIG. 25(B), and the dither method is one for recording the portion of the original corresponding to one picture element with one dot, as shown in FIG. 25(A) so that binary output data are obtained, respectively, as shown. These output data express a continuous image falsely in binary white and black values.

Now, if the continuous image (corresponding to the input data of FIG. 25) of an original could be estimated from the pseudo-continuous image thus made binary, a binary image having an excellent quality could advantageously be formed by a binary treatment using that pseudo-continuous tone image.

In the case of the density pattern image, the continuous image can be instantly restored if the arrangement of a pattern level is known. However, a resolution is low for the quantity of information.

On the contrary, the dither image has a higher resolution for the quantity of information than that of the density pattern image but is difficult to be returned to the original continuous image.

In case the continuous image is to be thus estimated, on the other hand, it is estimated without special consideration into the human visual characteristics and the kind of the image. As a result, the features of the image are not utilized so that the image quality cannot be sufficed. If the visual characteristics are also considered, the original continuous image can be copied better.

In case a picture element to be estimated has its density changing drastically as at an edge, on the other hand, the scanning aperture used is single to raise a defect that the edge cannot be restored to a satisfactory extent, even if the level of the continuous image is to be estimated by using one of sixteen kinds of scanning apertures. Since the human vision has a high power to discriminate the edge of an image, as is well known in the art, it recognizes the entirety of the reproduced image in the worse quality if the reproducibility of the edge is the more degraded.

SUMMARY OF THE INVENTION

An object of the present invention is to solve those problems of the prior art and to provide a binary continuous image estimation method for estimating an original continuous image excellently from a binary image (e.g., a binary dither image).

In order to solve the aforementioned problems, according to the present invention, there is provided a binary pseudo-continuous tone image estimation method comprising the steps of: setting a plurality kinds of and a plurality of scanning apertures for each kind in a binary image formed of a dither matrix; selecting only one scanning aperture satisfying a predetermined condition for each picture element of a continuous image to be estimated; and estimating said continuous image on the basis of the number of white or black picture elements in the scanning aperture selected.

If the image treatment is conducted with the condition that a gradation expression is made using a larger scanning aperture in a lower spatial frequency region and using a smaller scanning aperture in a higher spatial frequency region, it is possible to estimate a continuous image meeting the human visual characteristics.

Moreover, a continuous image including an edge can be estimated in view of coincidence of two binary images which are obtained by comparing for each aperture a binary image in a scanning aperture and an image made binary with a dither matrix from a continuous image formed on the basis of the number of white or black picture elements in the scanning aperture. This makes the restoration excellent at the edge.

Another object of the present invention is to provide a continuous image estimation method of a dither image for restoring the edge of a binary image excellently to a continuous image.

According to the present invention, moreover, there is provided a continuous image estimation method of a dither image formed of a dither matrix, comprising the steps of: setting a plurality of scanning apertures having an equal area; selecting only one scanning aperture satisfying a predetermined condition for each picture element of a continuous image to be estimated; and estimating said continuous image on the basis of the number of white or black picture elements in the scanning aperture selected.

The predetermined condition is that the patterns of two binary images obtained by comparing for each aperture a dither image in the scanning aperture and an image made binary with the dither matrix from the continuous image formed on the basis of the number of white or black picture elements in the scanning aperture.

In order to restore even the binary image including the edge excellently to the continuous image, it is sufficient that the scanning aperture including the estimated picture elements should not overlap that edge.

For this purpose, a plurality of scanning apertures having their estimated picture element positions defined are prepared, and such one of the scanning apertures not overlapping the edge that as many as estimated picture elements as possible are positioned at the center. This selecting condition is called the predetermined condition.

The aperture selection is conducted for each picture element of the dither image, and this dither image is formed on the basis of the estimated continuous image thus obtained. Then, the image can be restored without damaging the edge. The scanning aperture described above means a region is determined when the continuous level is calculated and can be scanned.

Other objects and features of the present invention will become apparent from the following description to be made with reference to the accompanying drawings.

BRIEF DESCRIPTION OF THE DRAWING

FIGS. 1(A) to 1(C) are explanatory diagrams showing a binary dither image from an original continuous image;

FIGS. 2(A) to 2(D) are diagrams showing a plurality of kinds of apertures;

FIGS. 3 to 6 are diagrams showing the locations of the estimated continuous image to be used in the plural kinds of apertures;

FIGS. 7 to 10 are diagrams showing estimated continuous images obtained when those apertures are used;

FIGS. 14(A) to 14(D) are explanatory views showing continuous image estimating steps;

FIG. 15(A) is a diagram showing one example of the estimated continuous image obtained according to the present invention;

FIG. 15(B) is a diagram showing the selecting situation of scanning apertures;

FIG. 16 is a flow chart showing a gradation conversion;

FIG. 17 is a diagram showing the gradation conversion characteristics;

FIGS. 18(A) to 18(D) are diagrams showing the binary processing by the gradation conversion;

FIGS. 21(A) to 21(E) are diagrams showing the binary processing by the filtration;

FIG. 22 is a flow chart showing the size enlargement and reduction;

FIGS. 23(A) to 23(E) are diagrams showing the binary processing by the size magnification and reduction;

FIGS. 24(A) to 24(C) are diagrams showing the relationships between the dither image when dither matrices of different threshold values are used and the estimated continuous image shown in FIG. 15;

FIGS. 25(A) and 25(B) are diagrams showing the binary method of the prior art;

FIG. 26 is a flow chart showing another example of the image treating step to be used for describing the continuous image estimation method according to the present invention;

FIGS. 27 and FIGS. 28(A) and 28(B) are diagrams showing the relationships between the dither image and the scanning apertures; and FIGS. 29(A) and 29(B) and 30(A) to 30(D) are explanatory diagrams showing the estimating step for obtaining estimated dither images from original dither images, respectively.

DESCRIPTION OF THE PREFERRED EMBODIMENTS

The present invention will be described in detail in the following in connection with the embodiments thereof with reference to the accompanying drawings.

Here, one of ordered binary dither method will first be described in case the Bayer type matrix of $4 \times 4$ is used as the threshold matrix.

FIGS. 1(A) to 1(C) are diagrams showing an example of a binary either image for explaining the present invention. FIG. 1(A) shows an original continuous image converted into digital data; FIG. 1(B) shows a binary dither threshold matrix of Bayer type of $4 \times 4$; and FIG. 1(C) is a binary dither image of the original image converted into a monochromatic binary image (i.e., a binary dither image) by the threshold matrix.

Incidentally, the binary dither image shown in FIG. 1(C) shows the white levels in blanks.

The Bayer type binary threshold matrix takes the dither pattern in which the threshold values 0 to 15 scatter, as shown in FIG. 1(B).

FIGS. 2(A) to (D) show one example of a plurality of kinds of scanning apertures (i.e., unit areas) having different aperture areas to be used in the present invention. FIGS. 2(A), 2(B), 2(0) and 2(D) show apertures having sizes of 2 rows $\times 2$ columns, 2 rows $\times 4$ columns, 4 rows $\times 2$ columns, and 4 rows $\times 4$ columns, respectively.

Moreover, these apertures to be prepared are in the numbers corresponding to the sizes of those matrices. As shown in FIGS. 3 to 6, therefore, there are prepared four scanning apertures A, eight apertures B and C, and sixteen apertures D, all of which have an equal area.

Furthermore, symbols X appearing in the apertures represent picture elements of the continuous images to be estimated. For example, an aperture A11 is used in such a superposed manner that a picture element to be estimated never fails to be located in a predetermined picture region (1, 1) indicated at the symbol X. As a result, in the case of an aperture A12, an estimated picture element is positioned in a predetermined picture region (1, 2).

The estimated continuousimages, as shown in FIGS. 7 to 10, are obtained by sequentially moving the individual predetermined picture regions shown in FIGS. 3 to 6 in a fixed state at unit of one picture element on the dither image of FIG. 1(C), by totaling the multiple-valued picture element levels contained in the apertures at the individual picture element positions, and by using the multiplication of that total value by a gain as the estimated value of the continuous image.

FIG. 7 shows the estimated continuous image when the aperture A of FIG. 3 is used. A continuous image A11' of FIG. 7 is obtained in case it is estimated using the aperture A11. Likewise, continuousimages A12' to D44' shown in FIGS. 7 to 11 are obtained in case they are estimated using the apertures A12 to D44.

Figure 10:
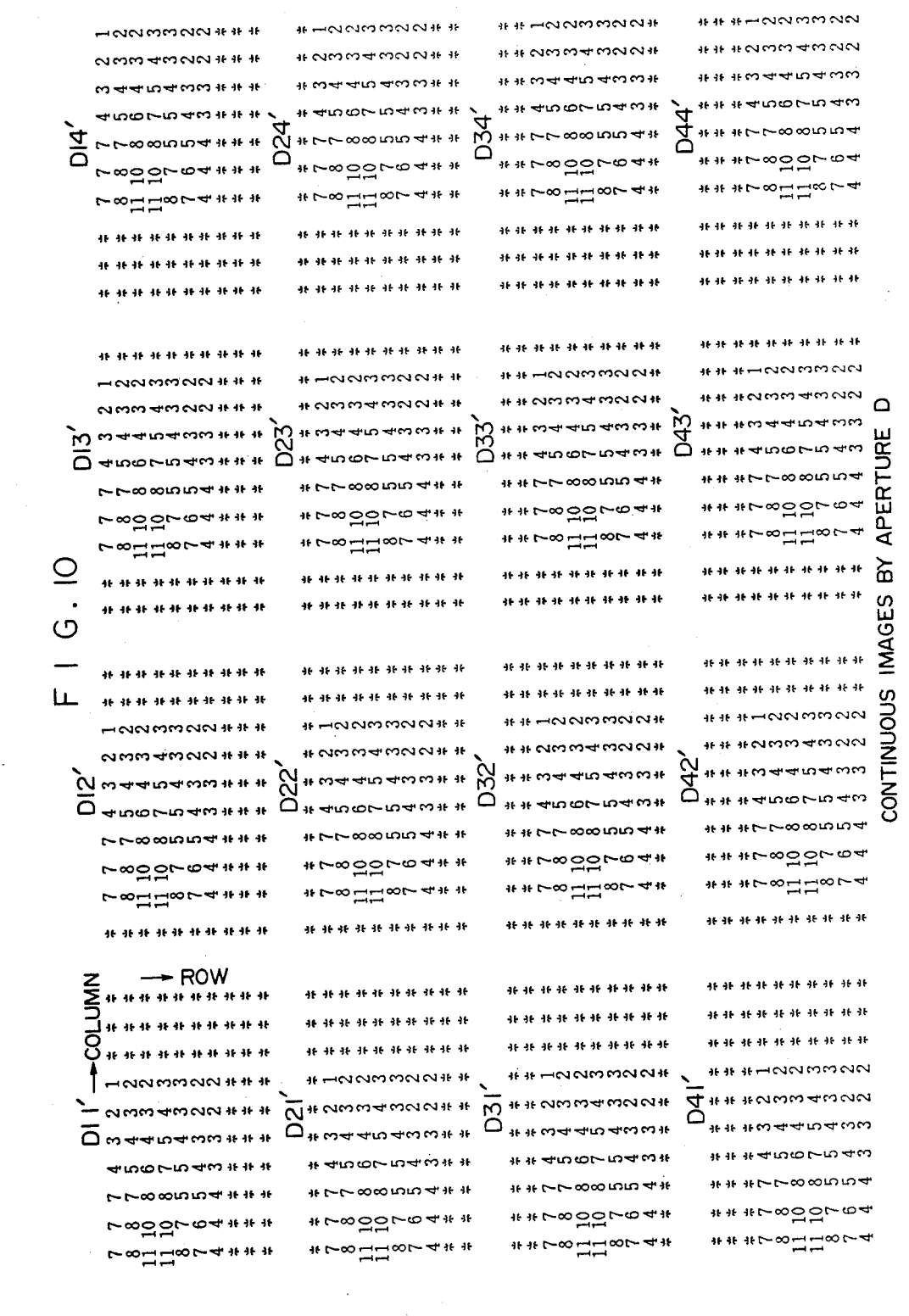

Here, the method for obtaining the estimated continuous image designated at D11' in FIG. 10 will be described in the following.

Figure 6:
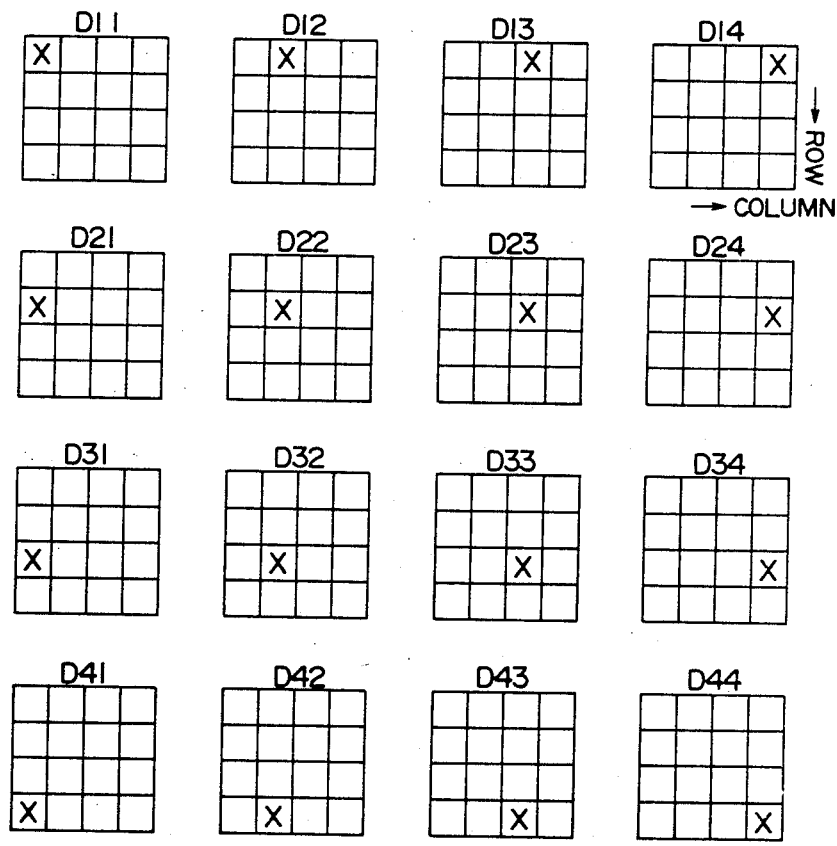
Figure 11:
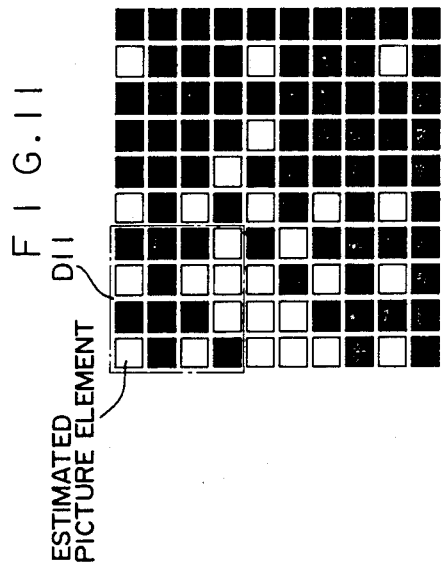
FIGS. 11 and 12 are diagrams showing the relationships between the dither image and the apertures.

Now, the aperture D defined at D11 in FIG. 6 is superposed, as shown in FIG. 11, at the initial position (in which the center position is located at the right-hand lower intersection of second row and second column, as will be expressed at [2, 2]in the following) of the dither image.

In this case, the picture elements contained in the aperture D11, as shown, are desired to be completely contained. In other words, the containment is preferred such that a picture element is not partially deficient.

Next, the numbers of white (or black)picture elements of the portion enclosed by that aperture D11 are totaled, and this total value is used as the estimated value of the continuous image, i.e., 7 in this case. Therefore, the estimated value of the position (1, 1) of first row and first column is 7.

Next, the aperture D11 is moved rightward for one picture element (i.e.. one column in this case), and the numbers of white picture elements in the aperture D11 at (1, 2) are similarly totaled to 7. These calculations are sequentially executed for all the columns of the same row.

When the first column is finished, moreover, the aperture D11 is moved to a next (i.e., second) column, and the continuous density estimations are sequentially executed likewise from the position in which the aperture center is located at [3, 2].

By executing these calculations up to the last column of the last row while sequentially moving the aperture, the continuous image estimation value is determined to finish the continuous image estimations. The result thus calculated is the estimated continuous image D11' shown in FIG. 10. Symbols * appearing in FIG. 10 represent the regions where the continuous image treatment cannot be conducted because there is no corresponding dither image data.

Next, the method for determining the estimated continuous image using the aperture B11 shown in FIG. 4 will be described in the following.

Figure 12:
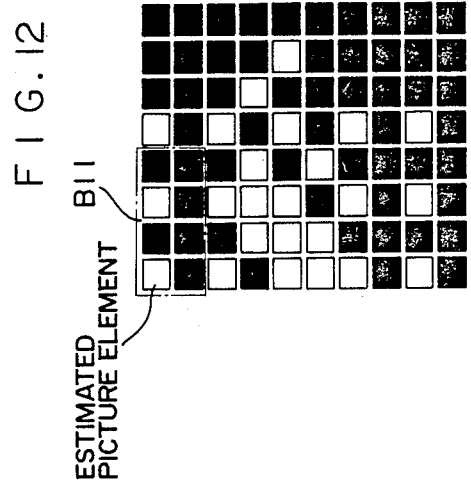

In case the aperture B11 is selected, its movement starting position is taken, as shown in FIG. 12. The total of the numbers of white picture elements in this state is 2, the total value in the aperture B11 has to be doubled so that the area may conform to that of the aperture of FIG. 2(D). As a result, the picture element level in the aperture B11 is 2×2=4. In this case, the gain of the apertures B (i.e., B11 to B24) is 2.

If the gains of the individual apertures shown in FIG. 2 are likewise determined, the apertures A (i.e., A11 to A22) have a gain 4, and the apertures C (i.e., C11 to C24) have a gain 2.

Figure 8:
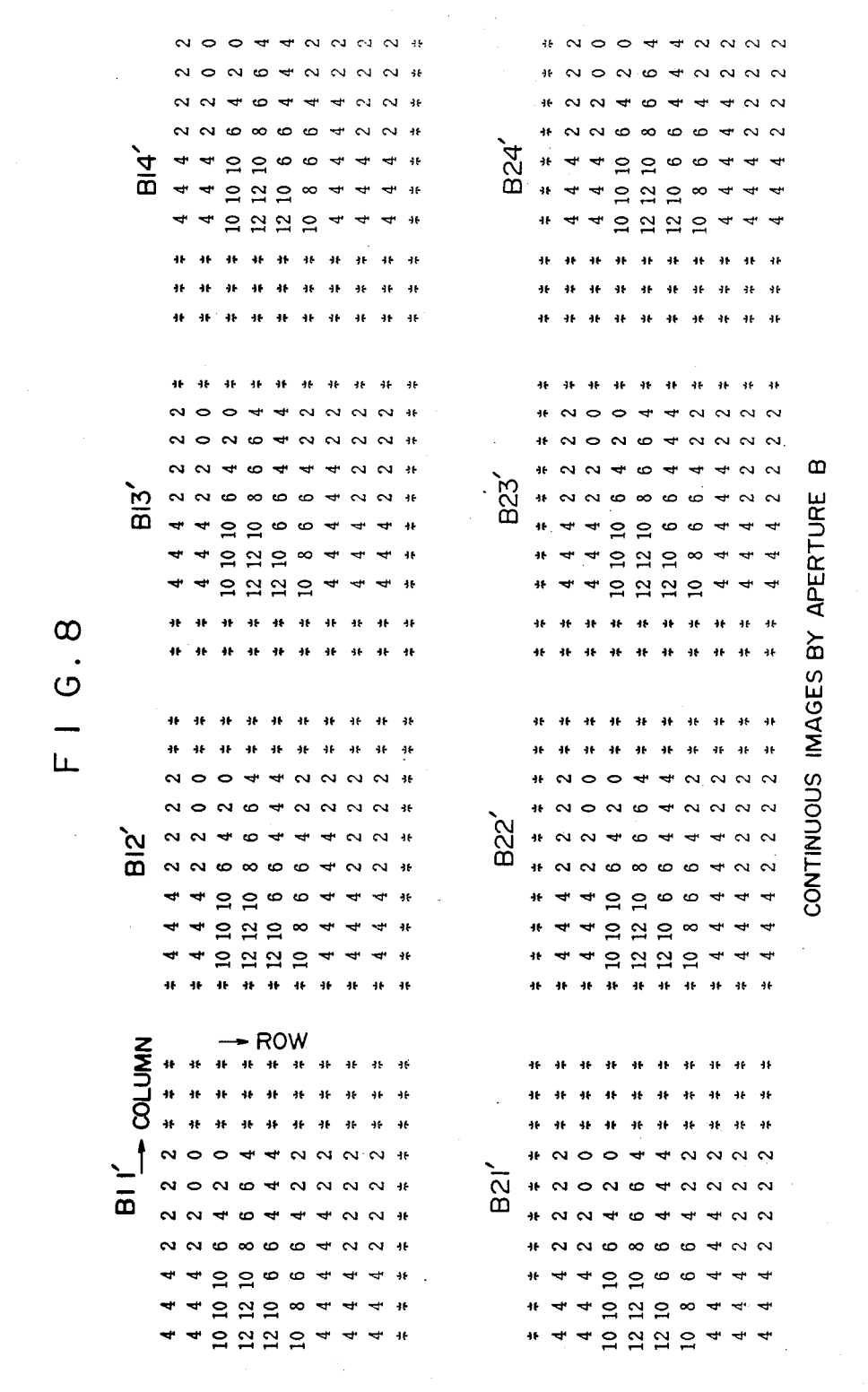
Figure 9:
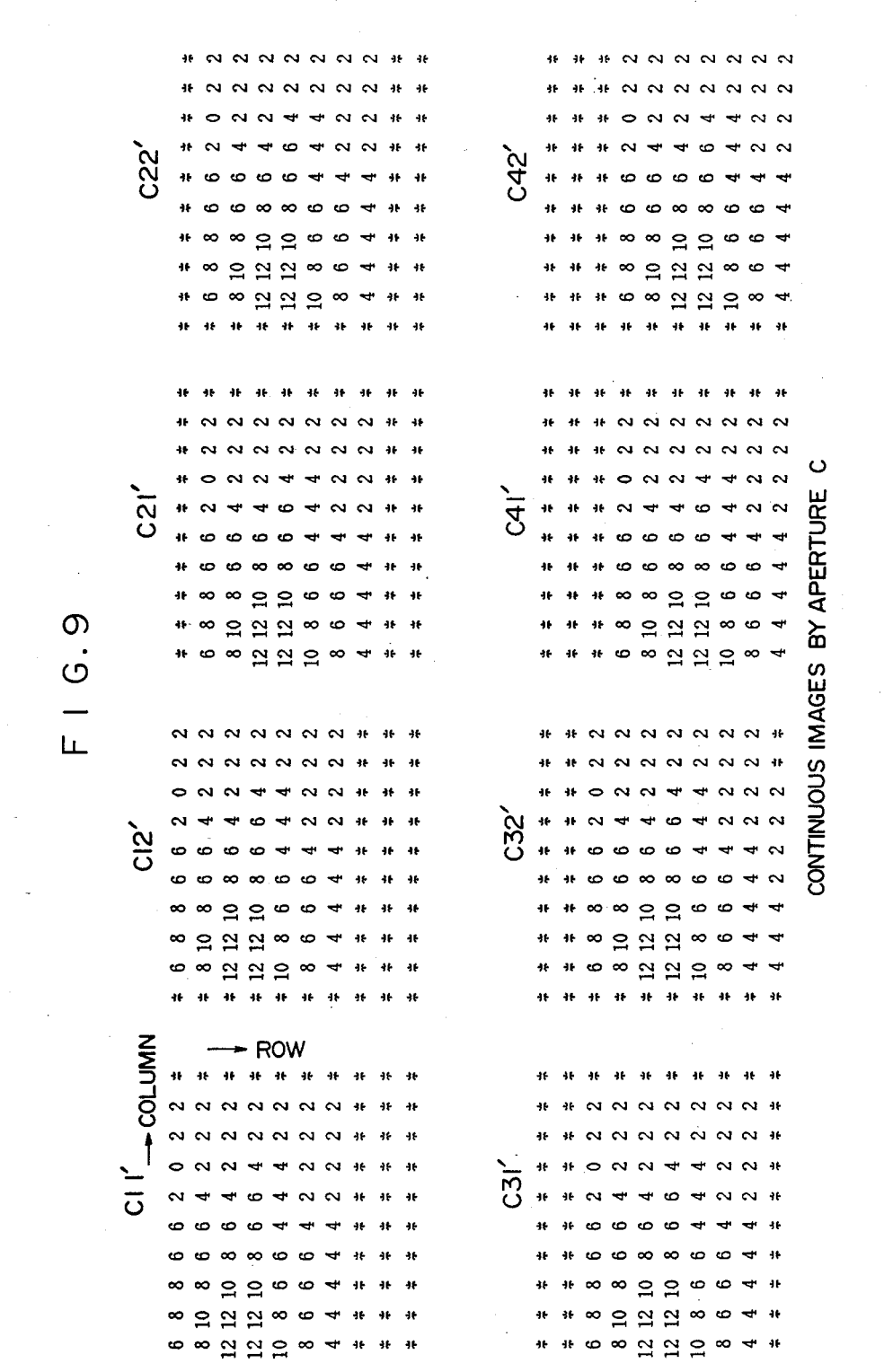

If this calculation is executed each time the aperture B11 is moved for each picture element, the continuous image shown in FIG. 8 is obtained. The descriptions of FIGS. 7 and 9 will be omitted because they can be similarly thought.

Even in this state of the fixed aperture, the half-tone image can be excellently estimated.

Of course, according to the method described above, the continuous image of FIG. 10, is estimated from the binary dither image (of FIG. 1(C)) having less information than the original continuous image shown in FIG. 1(A). Therefore, the continuous image of FIG. 10 is not completely coincident with that which is formed from the original continuous image shown in FIG. 1A.

However, the continuous image obtained fairly resembles the original continuous image except the portion of the original continuous image, in which the density level abruptly changes.

Here, the human vision has such characteristics that it has a high picture element level gradation discriminating ability in a lower spatial frequency region (where the picture element level less changes) but a lower picture element level gradation discriminating ability in a higher spatial frequency region (where the picture element level more changes).

Therefore, if a higher gradation expression is conducted with larger apertures in the lower spatial frequency region whereas an image of higher resolution is reproduced with smaller apertures in the higher spatial frequency region, it is possible to conduct a far better estimation than the estimated value of the continuous image shown in FIGS. 7 to 10.

In order to restore even the edge of a binary image excellently to a continuous image, moreover, it is sufficient to prevent the scanning apertures containing the estimated picture elements from overlapping that edge.

For this purpose, a plurality of scanning apertures having estimated picture element positions specified are prepared, and such one of the scanning apertures failing to overlap the edge that as many as estimated picture elements as possible be positioned at the center.

If these aperture selections are conducted for the individual picture elements of the dither image so that the dither image may be formed on the basis of the estimated continuous image thus obtained, the image can be restored without damaging the edge.

In the present invention, therefore, the continuous image is to be estimated considering the human picture element level gradation discriminating ability and edge discriminating ability.

The method of the present invention will be described specifically in the following.

This method is conducted, assuming that digital binary images have already been stored in storage means such as a memory, by setting a plurality of kinds of scanning apertures for those digital binary images, by subjecting the digital binary images to a predetermined arithmetic processing,- by selecting the most appropriate one for each picture element from the plural kinds of scanning apertures, by totaling the numbers of white or black picture elements in the scanning aperture selected, and by using the total value as the estimated value of the continuous image.

As the predetermined arithmetic processing, there is used such an algorithm that the larger scanning apertures are selected in the lower spatial frequency range (i.e., the range where the picture element level less changes) whereas the smaller scanning apertures are selected in the higher spatial frequency range (i.e., the range where the picture element level more changes).

In order that the edge of the estimated image may not overlap the end of the scanning aperture, moreover, the aperture selected is one whereas the estimated picture elements are located at the center of the scanning aperture as many as possible.

Therefore, the fundamental concept of the present invention is to select the scanning aperture which is as large as possible and in which the estimated picture elements are located near the center, so long as no density change is found in the scanning apertures.

Figure 13:
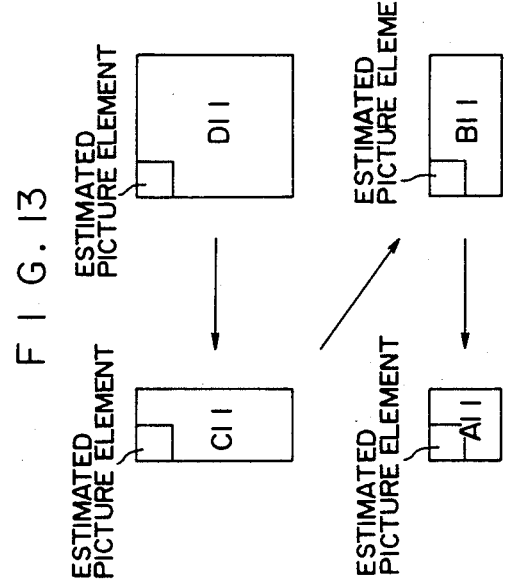
FIG. 13 is a diagram showing one example of the aperture selecting order.

With these in mind, the selecting order of the scanning apertures is basically D→C→B→A, as shown in FIG. 13. More specifically, the aperture selections are executed in the following order:

D23→D32→D22→D33→D12
→D43→D31→D24→D34→D21→D42→D13→
D41→D14→D44→D11→C21→B23→B12→C32-
→B22→C22→C31
→B13→C12→B11→B24→C41→B14→C42→C1-
1→B21→A21→A12→A22→A11.

When the estimated picture element is located at (1, 1), it is at the end so that the apertures to be used are of four kinds, which specifically follow the order, as shown in FIG. 13:

D11→B11→C11→A11.

FIGS. 14(A) to 14(D) are explanatory diagrams showing the estimation method in case the continuous image level of the picture element (1, 1) is to be estimated.

Step (1):

At this step, the aperture D11 is first selected as the scanning aperture.

Then, this scanning aperture D11 is superposed on the initial position (as shown in FIG. 11) of FIG. 1(C), as shown in FIG. 14(A). The total number of the white picture elements in this aperture D11 is 7. Assuming that the total value 7 is at an average picture element level, the individual picture elements are compensated by 7, as shown in FIG. 14(B). If the average picture element level image shown in FIG. 14(B) is made binary with the dither matrix shown in FIG. 14(C), a binary image shown in FIG. 14(D) is obtained. Here, the binary dither images (A) and (D) are compared and found to be not an identical pattern.

The fact that the binary dither images (A) and (D) do not have an identical pattern means that the picture element levels have changed. In this case, therefore, the scanning aperture D11 is not appropriate for one to be selected.

Since the scanning aperture D11 is not selected at the step (1), the process advances to the following step (2):

Step (2):

The scanning aperture to be selected at the step (2) is the aperture C11.

Then, if the selected aperture C11 is superposed on the initial position of FIG. 1(C), it is shown at the step (2) in FIGS. 14(A) to 14(D). The total number of the white picture elements in the scanning aperture C11 is 3. Assuming that the average picture element takes the level 66 which is obtained by multiplying the total value 3 by the gain 2, the individual picture elements are compensated with 6, as shown in FIG. 14(B). The average picture element level image shown in FIG. 14(B) is made binary into that shown in FIG. 14(D) with the dither matrix (i.e., such one of the threshold matrices of FIG. 1(B) as is composed of first and second columns in the scanning aperture C11) shown in FIG. 14(C).

Here, the binary dither images shows in FIGS. 14(A) and 14(D) are compared and found to have no identical pattern.

The fact that the two patterns are different means that the picture element levels have changed. In this case, therefore, the scanning aperture C11 is also improper for the selected aperture.

Since the scanning aperture C11 is not selected at the step (2), the process advances to the following step (3):

Step (3):

The scanning aperture to be selected at the step (3) is the aperture B11.

Then, if the selected aperture B11 is superposed on the initial position of FIG. 1(C), it is shown in FIG. 14(A). The total number of the white picture elements in the scanning aperture B11 is 2. Assuming that the average picture element takes the level 4 which is obtained by multiplying the total value 2 by the gain 2, the individual picture elements are compensated with 4, as shown in FIG. 14(B). The average picture element level image shown in FIG. 14(B) is made binary into that shown in FIG. 14(D) with the dither matrix shown in FIG. 14(C).

Here, the comparison of the binary dither images shown in FIGS. 14(A) and 14(D) reveals that their two patterns are identical. It is therefore estimated that the picture element level does not change in the scanning aperture B11.

Incidentally, if the patterns do not become identical even after those steps are sequentially passed, it is assumed that the minimum scanning aperture A is selected.

Thus, the scanning aperture B11 is selected. The total number of the white picture elements in the scanning aperture B11 is 2. Since the gain of the scanning aperture B11 is 2, the image estimation value to be determined is 2×2=4. In other words, the number of the white picture elements shown in FIG. 14 (B) of the step (3) of FIGS. 14(A) to 14(D) is used as it is as the continuous image estimation value.

The scanning apertures to be used in the estimation at the picture element (1, 2) and their selected order are as follows:

D12→D11→B12→C12→B11→C11→A12→A11.

The resultant aperture selected at this time is the aperture B12.

If the operations described above are conducted for each picture element of the binary dither image of FIG. 1(C), it is possible to obtain an estimated continuous image shown in FIG. 15(A). Incidentally, what scanning aperture is used for estimating each continuous image will be described with reference to FIG. 15(B). On first line: the first to seventh columns are such that the continuous estimation images (1, 1), (1, 2), (1, 3), (1, 4), (1, 5), (1, 6) and (1, 7) are B11, B12, B12, B12, B12, B12 and D11, respectively.

Thus, the estimated continuous image shown in FIGS. 15(A) and 15(B) matches the human visual characteristics, because it is estimated with the larger scanning apertures in the region of less change in the picture element level and with the smaller scanning apertures in the region of more change in the picture element level.

As a result, the estimated continuous image remarkably resembles the continuous image obtained from the original continuous image shown in FIG. 1(A).

Moreover, in case the patterns are incoincident, the one of the scanning apertures to be compared, in which the pattern has a smaller number of in coincident picture elements, is selected. In case the numbers of the in coincident picture elements are equal, the scanning aperture having the estimated picture elements closer to the center is selected. There arises no possibility that the edge of the image overlaps the end of the scanning aperture.

Incidentally, the description thus far made is directed to the case in which the continuous image is estimated from the binary image. Despite this fact, however, a new binary image can be obtained by converting the gradation of the continuous image estimated, by filtering the continuous image or by enlarging or reducing the size of the continuous image.

FIG. 16 is a flow chart showing the case in which the estimated continuous image has its gradation converted (or subjected to the gradation treatment). According to this flow chart, as shown, the continuous image is subjected to the gradation conversion, and the continuous image thus converted is formed into a new binary image by the use of the threshold matrix.

The gradation conversion characteristics conceivable are shown in FIG. 17. Gradation conversion characteristic curves f1 and f2 are plotted in terms of an output against an input. Numerical values appearing in FIG. 17 represent the density levels.

FIG. 18(A) shows the continuous image which has its gradation converted with the f1 characteristics of FIG. 17 from the image shown in FIG. 15(A); FIG. 18(B)

shows the continuous image which has its gradation converted with the f2 characteristics of FIG. 17. FIG. 18(C) shows the binary image which is made binary with the aforementioned Bayer type binary dither matrix from the image shown in FIG. 18(A). FIG. 18(D) shows the binary image which is made binary from the image shown in FIG. 18(B). It is apparently found from FIGS. 18(C) and 18(D) that the binary images are made drastically different due to the difference in the gradation conversion characteristics.

Figure 19:
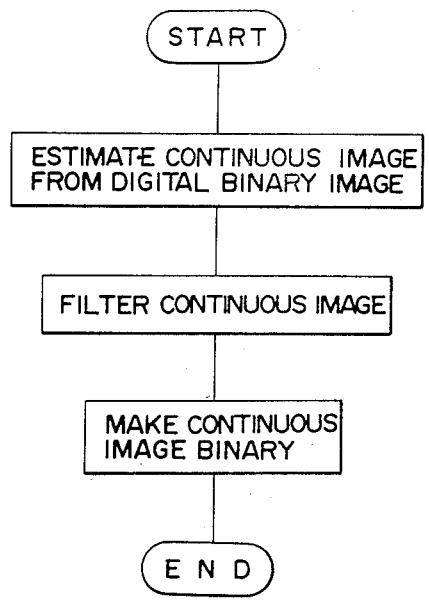
FIG. 19 is a flow chart showing the filtration.

FIG. 19 is a flow chart showing the case in which the estimated continuous image is to be filtered. According to the flow chart, as shown, the continuous image estimated by the present invention is filtered, and the continuous image thus filtered is formed into a new binary image by the use of the threshold matrix.

Figures 20A, 20B:
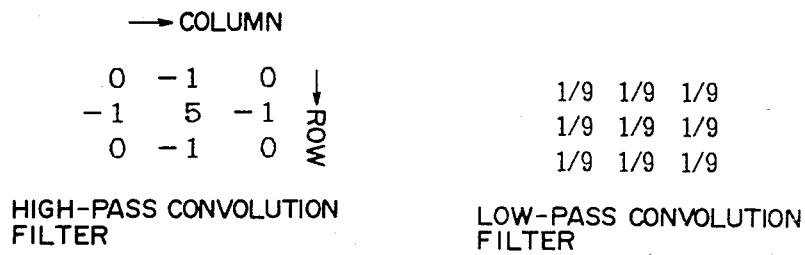
FIGS. 20(A) and 20(B) are diagrams showing the filter characteristics.

The filter characteristics are exemplified in FIGS. 20(A) and 20(B). FIG. 20(A) shows a high-pass convolution filter, and FIG. 20(B) shows a low-pass convolution filter.

If the estimated continuous image shown in FIG. 15(A) is filtered with the filter having the characteristics shown in FIGS. 20(A) and 20(B), the high- and low-pass continuous images are obtained, respectively, as shown in FIGS. 21(A) and 21(B). If these continuous images are made binary with the dither matrix shown in FIG. 21(C), there are obtained the binary dither images, as shown in from FIGS. 21(A) to 21(D) and from 21(B) to 21(E), respectively.

FIG. 22 is a flow chart showing the case in which the estimated continuous image is to be enlarged or reduced. According to the flow chart, as shown, the continuous image estimated by the present invention is enlarged or reduced, and a new binary image is obtained from the enlarged or reduced continuous image by the use of the threshold matrix. An interpolation, for example, is used as the enlarging or reducing method.

FIG. 23(A) shows the continuous image which is enlarged 1.25 times from the continuous image shown in FIG. 15(A) by the simplest Nearest Neighborhood method of the interpolations. FIG. 23(B) shows the continuous image which is reduced 0.75 times from the same by the same method.

If these continuous images are made binary with the dither matrix shown in FIG. 23(C), there are obtained the enlarged and reduced binary images, respectively, as shown in FIGS. 23(D) and 23(E).

Incidentally, the matrix having the threshold value shown in FIG. 14(B) can be used as the dither matrix. If this matrix is used, slightly different binary images are obtained even in case the same continuous image level is used.

More specifically, if the dither matrix shown in FIG. 24(B) is used for the continuous image of FIG. 24(A), the dither image is obtained, as shown in FIG. 24(C).

Incidentally, in case the continuous image is to be estimated from the aforementioned binary image, this binary image is preferably a binary dither image or a binary density pattern image and more preferably the binary dither image.

In case the binary dither image is to be used, the binary image according to the ordered binary dither method is more preferable than the random dither or conditional dither so that each threshold value may enter the aperture of the maximum area. Moreover, a dispersion type binary dither image is preferable so that the threshold values may evenly enter the aperture of the minimum area, and the Bayer type binary dither image having its threshold values dispersed completely is more preferable.

Incidentally, in the description made above, the continuous image is obtained by scanning each picture element. Despite of this fact, however, the present invention should not be limited to the above but may scan every two ore more picture elements.

In the description made above, moreover, the plural kinds of apertures are exemplified by the case of four kinds, but no limitation is given to the kinds of apertures. Nor should the sizes of the apertures be limited to the exemplified ones but may be arbitrary.

As has been described hereinbefore, according to the embodiment of the present invention, a plurality of kinds of scanning apertures are set, and the most appropriate one is selected from those scanning apertures by a predetermined arithmetic operation for each picture element.

In this case, according to the present invention, a higher gradation expression is conducted in a lower spatial frequency range by using larger scanning apertures, and an image of higher resolution is reproduced in a higher spatial frequency range by using smaller scanning apertures. This makes it possible to estimate the continuous image at a higher level than the continuous image estimation value shown in FIGS. 7 to 10.

According to the present invention, moreover, the scanning aperture allowing the estimated picture element to come to the center of the scanning aperture is selected to improve the restoration of the edge so that a continuous image of excellent quality can be estimated by the aforementioned effect.

Image treatments such as the gradation conversion or the size enlargement or reduction can be conducted on the basis of such continuous image, if obtained.

FIG. 26 is a flow chart showing an image treatment for implementing the continuous image estimation method of a dither image according to another embodiment of the present invention.

First of all, a dither image (i.e., an original dither image) is formed (at a step 1) from an original continuous image. For forming this original dither image, the dither matrix having predetermined size and threshold level is used, as shown in FIG. 1(B), and the threshold level of that dither matrix and the level (as shown in FIG. 1(A)) of the original continuous image are compared for each picture element so that the original continuous image is converted into the binary image (i.e., the dither image) having values "1" and "0" (as shown in FIG. 1(C)).

On the basis of the original dither image thus formed, the estimated dither image is formed (at a step 2) by using a plurality of scanning apertures.

In this case, the original dither image is so compensated (at a step I of FIGS. 29(A) and 29(B) and 30(A) to 30(D)) into the binary image that its picture elements to be estimated become coincident With the estimated picture elements (of sixteen kinds, as shown in FIG. 6) defined by those scanning apertures.

If the binary image thus obtained is called the "estimated dither image", the numbers of the white or black picture elements in this estimated dither image are counted. In the present embodiment, the numbers of the white picture elements in the scanning aperture are counted, and the counted value is estimated (at a step II of FIGS. 29(A) and 29(B) and 30(A) to 30(D)) as the continuous image level of all the picture elements in the scanning aperture.

Next, the levels of the individual picture elements of that estimated continuous image are compared (at a step III of FIGS. 29(A) and 29(B) and 30(A) to 30(D) with the threshold values of the dither matrix and again made binary (at a step IV of the same Figures).

The pattern comparisons of this binary image and the estimated dither image are executed at a subsequent step 3. These pattern comparisons are accomplished at the scanning apertures of sixteen kinds, respectively.

In the case of coincidence of the patterns, the continuous image at this time is used (at a step 4) as the estimated continuous image for the picture element because the pattern of the estimated dither pattern is correct.

In the case of incoincidence of the patterns, the numbers of the incoincident picture elements are counted (at a step 6), and the estimated dither image having the minimum number of the in coincident picture elements is detected (at a step 7). Next, the numbers of tho white (or black) picture elements of the estimated dither image thus detected are counted, and this counted value is estimated (at a step 5) as the level of the continuous image of that estimated picture element.

Incidentally, by the use of the continuous image thus estimated for each picture element, the final dither image is obtained by making that continuous image binary by the use of the dither matrix having an appropriate threshold level.

In this embodiment, a plurality of scanning apertures including estimated image regions are prepared in advance, and such one of the scanning apertures apart from the edge that the estimated picture element is as near as possible the center of the dither image is selected.

The selecting order of the scanning apertures is determined such that the scanning apertures in positions gradually apart from the center of the picture element of the dither image are sequentially selected. One example of the apertures is described in the following:

D23→D32→D22→D33→D12→D43→D31→D24
→D34→D21→D42→D13→D41→D14→D44→
D11.

These selections are conducted for each of the estimated picture elements.

One example of the aperture selections will be described with reference to FIGS. 27 and so on. First of all, the picture element level of the dither image on coordinates (1, 1) will be estimated.

Since the picture element (1, 1) is present in the scanning aperture D11 only, this aperture D11 automatically becomes the aperture to be selected so that the numbers of the white picture elements in this aperture are counted. The number of the white picture elements in this case is 7, which value becomes the estimated continuous level (as shown in FIG. 15(A)).

In the case of the picture element (1, 2), the apertures D11 and D12 are used. Since, in this case, the estimated picture element in the aperture D12 is nearer the center, the estimation is executed from the aperture D12, and the relationship between the dither image and the aperture D12 is shown in FIG. 28(A).

Figure 29A:
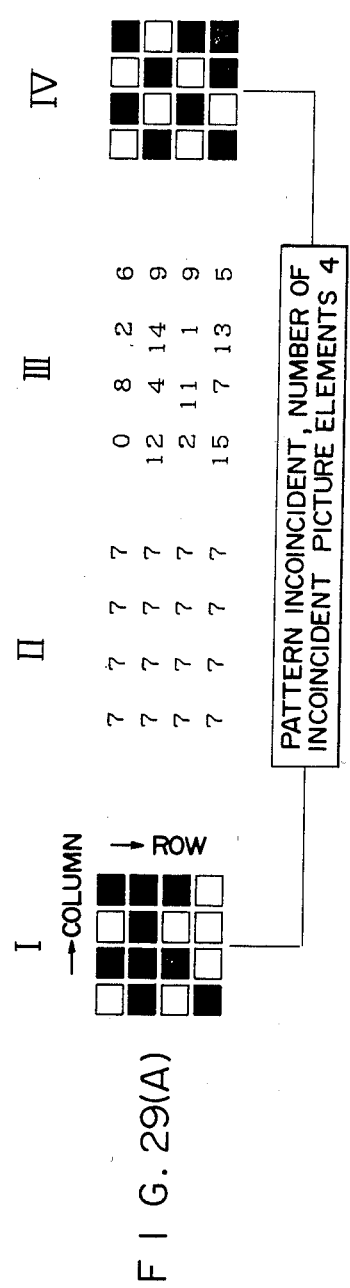

As a result, the number of the white picture elements in the scanning aperture in this case is 7, which value is first estimated (at I and II of FIG. 29(A)) as the level of the estimated continuous image, and the matrix compensated with this estimated continuous image value is compared (at III of the same Figure) for each picture element with the dither matrix. As a result, the estimated dither image is obtained, as shown at IV of the same Figure.

This estimated dither image and the original dither image have their patterns compared. In the case of pattern incoincidence, the number of the in coincident picture elements is counted. The counted number is 4 in FIGS. 29(A) and 29(B).

Figure 29B:
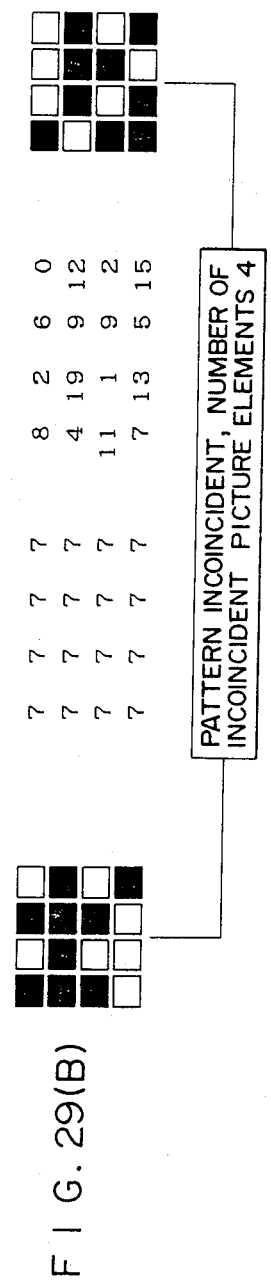

A Similar comparison is executed for the scanning aperture D11. This comparing step is shown in FIG. 29(B). As is apparent from this Figure, the patterns are not coincident. The number of the in coincident picture elements is 4.

Thus, the patterns of the original dither image and the estimated dither image are not coincident in either case of the apertures D11 or D12.

In this case, the image having a smaller number of incoincident picture elements is preceded. If the numbers of the incoincident picture elements are equal, the scanning aperture having the estimated picture elements nearer the center of the dither image is selected.

In the case of FIGS. 28(A) and 28(B), therefore, the scanning aperture D12 is selected, and the estimated continuous image at this time has a level 7.

Subsequently, the level of the continuous image at the picture element (1, 3) is estimated with reference to FIGS. 30(A) to 30(D), as follows. In this case, as shown in FIGS. 30(A) to 30(0), the four apertures D11 to D14 are selected, and what is selected first of all is the aperture located nearest the center.

In the aperture D12, as shown in FIG. 30(A), the estimated continuous image has a level 4, and the pattern of the estimated continuous image resulting from the comparison with the dither matrix is as shown at IV of FIG. 30(A) so that it does not coincide with the pattern of the original dither image. The number of the incoincident picture elements at this time is 4.

Similar comparisons and estimations are sequentially executed for each scanning aperture, and the levels of the estimated continuous images and the patterns of the estimated dither images are shown in FIGS. 30(B) to 30(D). The pattern comparisons and the counts of the incoincident picture elements executed are also shown.

Here, the numbers of the in coincident picture elements of the scanning apertures D12 to D14 are 4, but the estimated continuous image level at this time is 7. Therefore, the selected aperture of the picture element (1, 3) is D12, and the estimated continuous image level selected is 7.

Thus, the aperture selections and the estimations of the continuous image levels are executed for the individual picture elements. One example of the estimated continuous image levels thus determined is shown in FIG. 15(A). Moreover, what aperture is selected for each picture element is shown in FIG. 15(B).

Incidentally, what scanning aperture is selected for each continuous image estimation will be described by taking up the first row as an example. That is to say, the apertures D11, D12, D12 and D12 are selected for (1, 1), (1, 2), (1, 3) and (1, 4) of the continuous estimation image.

Thus, the estimated continuous image shown in FIG. 15(A) is estimated from the continuous image by sequentially selecting for each picture element that one of the scanning apertures failing to overlap the edge, which has its estimated picture element as near the center as possible. The continuous image does not have its level deviated seriously from that of the original continuous image.

As a result, the estimated continuous image excessively resembles the original continuous image shown in FIG. 1(A).

As has been described hereinbefore, according to the embodiment of the present invention, in the dither image formed with the dither matrix, the continuous image is estimated such that the scanning aperture including the estimated image does not overlap the edge of the image where the density changes drastically. The edge of the image can be restored excellently to a continuous image.

As a result, according to the present invention, it is possible to conduct an image treatment matching the human visual characteristics.

Since, moreover, a continuous image near the original continuous image can be obtained relatively simply, a variety of image treatments such as the gradation conversions, or the size enlargements or reductions can be advantageously conducted by making use of such continuous image.

What is claimed is:

1. A continuous tone image estimation method of a binary image, comprising the steps of: setting a plurality of kinds of scanning aperatures and a plurality of scanning apertures to be in different positions from one another for each of said plurality of kinds in the binary image selecting only one of said scanning apertures satisfying a predetermined condition for each picture element of a continuous tone image to be estimated; and estimating said continuous tone image on the basis of the number of white or black picture elements in the selected scanning aperture.

2. A continuous tone image estimation method according to claim 1, wherein said predetermined condition is that a gradation expression is conducted in a lower spatial frequency range by using larger scanning apertures and in a higher spatial frequency range by using smaller scanning apertures.

3. A continuous tone image estimation method. according to claim 2, wherein said binary image is an ordered binary dither image.

4. A continuous tone image estimation method according to claim 3, wherein said ordered binary dither image is a dot dispersion type binary dither image.

5. A continuous tone image estimation method according to claim 4, wherein said dot dispersion type binary dither image is the Bayer type binary dither image.

6. A continuous tone image estimation method according to claim 4, wherein the size and shape of that one of said plurality of kinds of scanning apertures, which has the maximum area, are made identical to those of a threshold matrix of said ordered binary dither image.

7. A continuous tone estimation method according to claim 1, wherein said predetermined condition is that for the coincidence between patterns of a binary image in the selected scanning aperture and a binary image, which is made binary with a dither matrix formed on the basis of the number of the white or black picture elements in the selected scanning aperture, the patterns being obtained by comparing said dither image and said binary image for each aperture.

8. A continuous tone image estimation method according to claim 3, wherein said binary image is an ordered binary dither image.

9. A continuous tone image estimation method according to claim 8, wherein said ordered binary dither image is a dot dispersion type binary dither image.

10. A continuous tone image estimation method according to claim 9, wherein said dot dispersion type binary dither image is the Bayer type binary dither image.

11. A continuous tone image estimation method according to claim 8, wherein the size and shape of that one of said plurality of kinds of scanning apertures, which has the maximum area, are made identical to those of a threshold matrix of said ordered binary dither image.

12. A continuous tone image estimation method of a binary image, comprising the steps of: setting a plurality of scanning apertures having an equal area; selecting only one of said scanning apertures satisfying a predetermined condition for each picture element of a continuous tone image to be estimated; and estimating said continuous tone image on the basis of the number of white or black picture elements in the selected scanning aperture.

13. A continuous tone image estimation method according to claim 12, wherein said predetermined condition is that for the coincidence between patterns of a binary image in the selected scanning aperture and a dither image, which is made binary with a dither matrix formed on the basis of the number of the white or black picture elements in the selected scanning aperture, the patterns being obtained by comparing said binary image and said dither image for each aperture.

14. A continuous tone image estimation method according to claim 13, wherein said binary image is a dot dispersion type dither image.

15. A continuous tone image estimation method according to claim 14, wherein said dot dispersion type dither image is the Bayer type dither image.

16. A continuous tone image estimation med according to claim 13, wherein the size of said scanning apertures is made equal to that of a threshold matrix of said binary image.

17. A continuous tone image estimation method according to claim 12, wherein said binary image is a dot dispersion type dither image.

18. A continuous image estimation method according to claim 17, wherein said dot dispersion type dither image is the bayer type dither image.

19. A continuous tone image estimation method according to claim 12, wherein the size of said scanning apertures is made equal to that of a threshold matrix of said binary image.

* * * * *